(No Model.)

C. H. TRASK.
MILLING TOOL.

No. 436,323. Patented Sept. 9, 1890.

WITNESSES
J. M. Dolan
A. P. Porter

INVENTOR
Charles H. Trask
by his attys
Clarke & Raymond

UNITED STATES PATENT OFFICE.

CHARLES H. TRASK, OF LYNN, MASSACHUSETTS.

MILLING-TOOL.

SPECIFICATION forming part of Letters Patent No. 436,323, dated September 9, 1890.

Application filed December 9, 1889. Serial No. 333,164. (No model.)

*To all whom it may concern:*

Be it known that I, CHARLES H. TRASK, of Lynn, in the county of Essex and State of Massachusetts, a citizen of the United States, have invented a new and useful Improvement in Milling-Tools, of which the following is a full, clear, and exact description, reference being had to the accompanying drawings, forming a part of this specification, in explaining its nature.

The invention relates to a gear-cutter for forming at the inner end of each tooth-receiving recess of a gear a slight projection or extension something in the form of a rib, extending from side to side of the tooth-receiving recess, and forming a narrow seat against which the ends of the teeth of the meshing gear or pinion come in contact, the advantage of the seat being that it is narrow and prevents the grinding of the end of the entering tooth upon a large surface, as the end of the tooth-receiving recess would present if the narrow seat were not employed.

The making of tooth-receiving recesses in gears involves the use of a milling-tool of peculiar form, which is hereinafter described.

Figure 1:
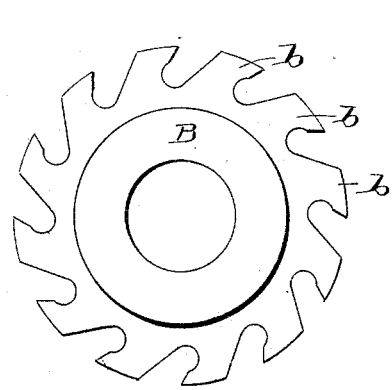
Figure 2:
Figure 3:
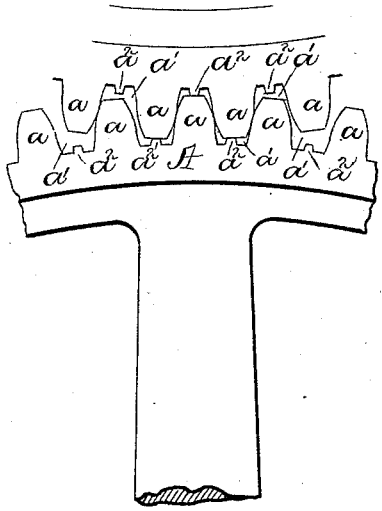

Referring to the drawings, Figure 1 is a view in plan of the gear-cutter. Fig. 2 is a view in vertical section thereof. Fig. 3 is a detail view representing parts of two intermeshing gears to illustrate the application of the invention.

A represents the two meshing gear-wheels; $a$, their teeth; $a'$, teeth-receiving recesses, and $a^2$ the narrow seats at the inner end of each recess. These seats are formed integral with the metal of the gear by means of a milling-tool B, having the working-teeth $b$, of any suitable form, and also having in the face of each tooth the rounded V-shaped recess $b'$. (See Fig. 2.) A tool having this recess will form, as the teeth of the gear are being milled, the seating-rib at the base of each pocket and at no additional expense.

Having thus fully described my invention, I claim and desire to secure by Letters Patent of the United States—

A gear milling-tool having the bead or seat forming recess $b'$, as and for the purposes described.

CHARLES H. TRASK.

Witnesses:
F. F. RAYMOND, 2d,
J. M. DOLAN.